C. C. WENTWORTH.
TRACK SCALE LOAD SUPPORTING OR PLATFORM BEAM.
APPLICATION FILED OCT. 24, 1912.
1,147,471. Patented July 20, 1915.
2 SHEETS—SHEET 1.
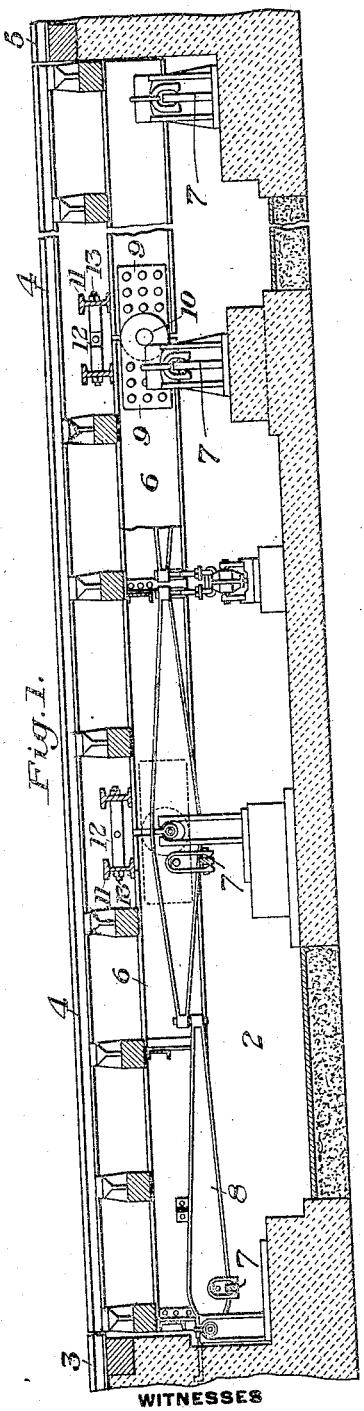
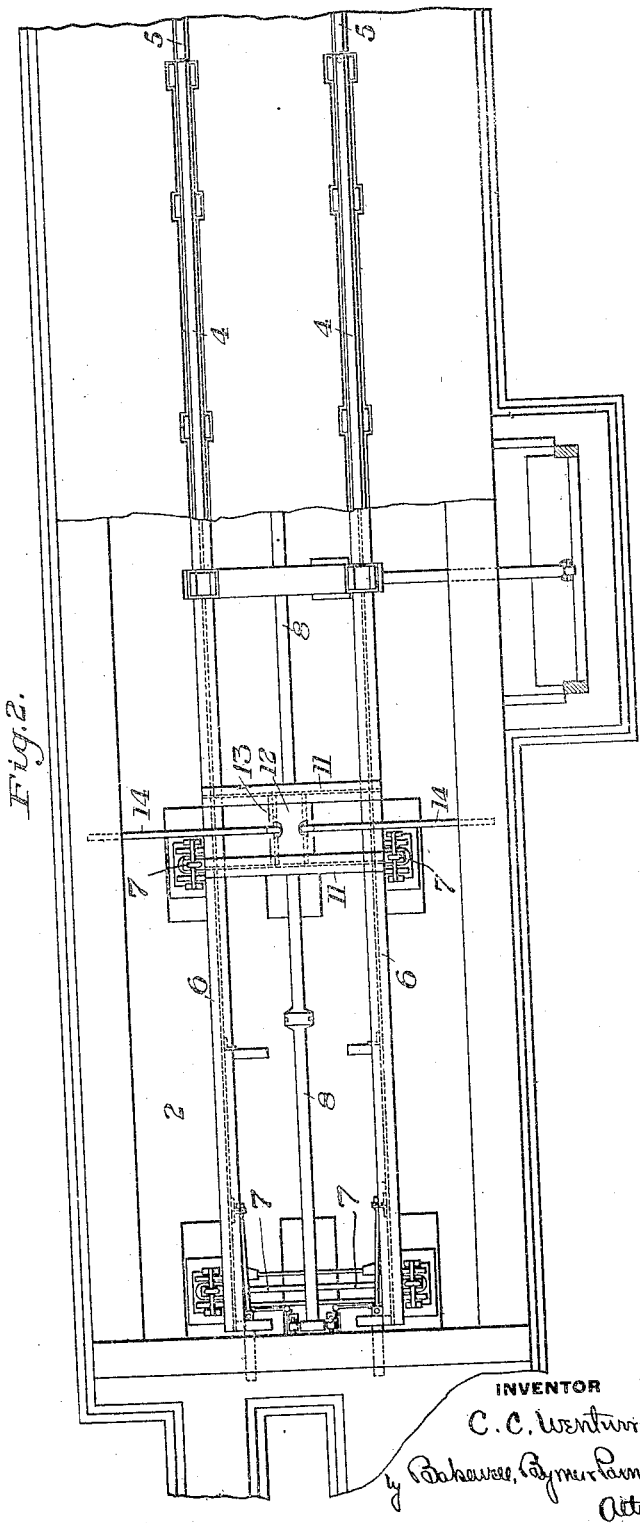

C. C. WENTWORTH.
TRACK SCALE LOAD SUPPORTING OR PLATFORM BEAM.
APPLICATION FILED OCT. 24, 1912.
1,147,471.
Patented July 20, 1915.
2 SHEETS—SHEET 2.
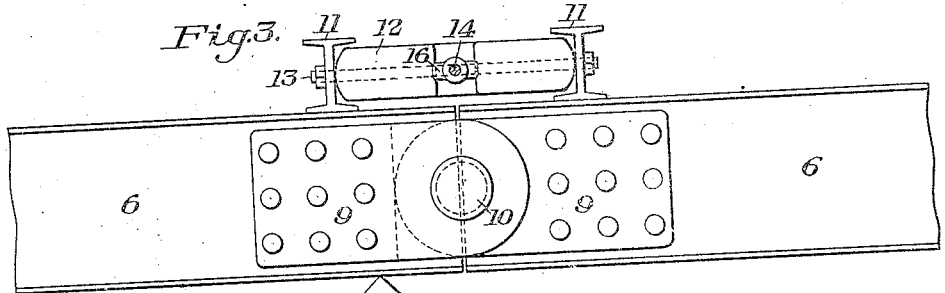
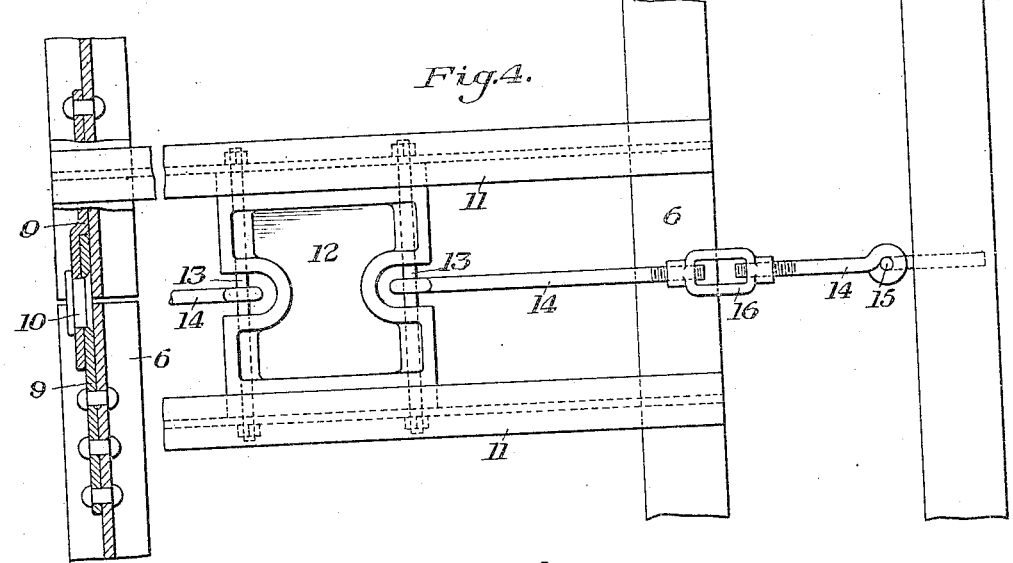
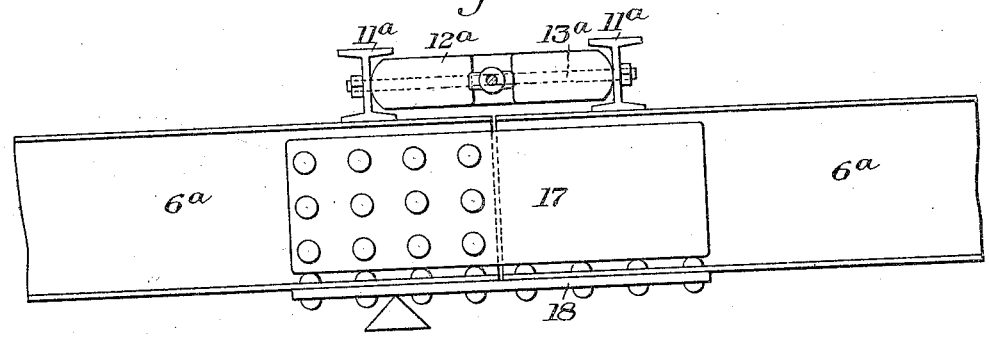
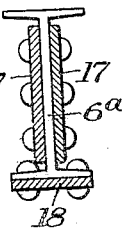
WITNESSES
INVENTOR

UNITED STATES PATENT OFFICE.

CHARLES C. WENTWORTH, OF ROANOKE, VIRGINIA.

TRACK-SCALE LOAD-SUPPORTING OR PLATFORM BEAM.

1,147,471.  Specification of Letters Patent.  Patented July 20, 1915.

Application filed October 24, 1912. Serial No. 727,572.

*To all whom it may concern:*

Be it known that I, CHARLES C. WENTWORTH, a resident of Roanoke, Roanoke county, Virginia, have invented a new and useful Improvement in Track-Scale Load-Supporting or Platform Beams, of which the following is a full, clear, and exact description, reference being had to the accompanying drawings, forming part of this specification, in which—

Figure 1 is a longitudinal sectional view through a track scale on two different planes showing one form of my improvement attached thereto; Fig. 2 is a plan view with portions broken away to show the track supporting mechanism and a portion of the scale levers; Fig. 3 is a detail view showing one form of connection between adjacent sections of the load-supporting beam; Fig. 4 is a detail plan view of a portion of one of the load-supporting beams and the anchoring mechanism; Fig. 5 is a view similar to Fig. 3 showing a modified form of load-supporting beam construction; and Fig. 6 is a detail sectional view through the load-supporting beam shown in Fig. 5.

This invention relates to an improvement in load-supporting or platform beams for railroad scales, and is designed to provide a cheap and efficient device which will overcome the distortion of the load-supporting beams, such as is caused by running heavy cars onto the scales.

Heretofore, the tracks on which the cars were supported were mounted on continuous load-supporting beams which were, in turn, supported on the lever mechanism of the scales at a plurality of points between the ends of said load-supporting beams. When the load was supported on one end of the load-supporting beams between two of the scale levers, the opposite ends of the load-supporting beams would be deflected upwardly with relation to the other end, and very frequently the load-supporting beams would retain a set, so that the scale would not act in a proper manner. If, for instance, the continuous load-supporting beams should be supported at four points in a manner similar to that shown in the drawings, and the load were resting on the track 4 between the two transverse levers 7, adjacent to the tracks 3, the ends of the load-supporting beams adjacent to the track 5 would be deflected upwardly. If the load should be moved to the center of the scales, both ends of the continuous load-supporting beams would be deflected upwardly as the greater portion of the load would rest on two central transverse levers 7. I have overcome this by dividing the load-supporting beams into a plurality of sections connected to each other by means of flexible connections, so that one portion of the load-supporting beams can move relative to the other portion or portions thereof; these flexible connections being located at or adjacent to the points where the load-supporting beams are supported on the scale lever mechanism.

The precise nature of my invention will be best understood by reference to the accompanying drawings, which will now be described, it being premised, however, that various changes may be made in the details of construction of the beam and general arrangement of the connections between the several parts of the beams without departing from the spirit and scope of my invention as defined in the appended claims.

Referring to the accompanying drawings, the numeral 2 designates the pit, in which the scale mechanism is located.

3 designates the tracks leading to the tracks 4 of the scale, and 5 are tracks leading from the scale tracks 4. These scale tracks are connected to cross-ties, which are in turn supported on the sectional load-supporting beam 6, and rest on transverse scale levers 7, which are connected to the longitudinal scale levers 8.

In the drawings, I have shown the load-supporting beams 6 divided into three sections, the points between the sections being bridged by the track rails 4, although it will readily be understood by those familiar with the art that they may be divided into any number of sections, the number of sections being determined by the type of scale to which they are to be applied.

In Figs. 1 to 4, I have shown the load-supporting beams formed of I-beam sections. Secured to adjacent ends of the load-supporting beam sections are hinge members 9, which are connected to each other by means of a pivot pin 10, so that one section can flex relative to the adjacent sections. 11, 11 designate tie bars secured to adjacent sections of the load-supporting beams, and secured together by means of a longitudinal spacer 12, and bolts 13 passing through the webs of the tie bars and the spacers, there being sufficient freedom between these parts to permit the load-supporting beam sections to move about the pivots the required distance to prevent upward deflection of the extreme ends of the beam when the load is moved to rest centrally between the supports of the scale levers 7. Pivotally connected to the bolts or rods 13 are links 14, the other ends of which pivotally engage hook members 15 secured to the walls of the scale pit; and 16 are turn buckles between the ends of the links 14 for adjusting their lengths. The tie bars prevent lateral movement of the beams with relation to each other, while the links 14 prevent swaying of the scale and load-supporting beams with relation to the walls of the pit.

In Figs. 5 and 6 I have shown a modified form of connection between the two sections of the load-supporting beam, and in which 6ª, 6ª designate several of the sections of a load-supporting beam. Connected to the web of one of the sections are plates 17, which extend considerably beyond the end of the adjacent section 6ª and engage the web thereof. 18 is a gusset plate connected to the bottom flanges of both of the sections. In this construction the two load-supporting beams are held in proper relation to each other by means of the tie members 11ª, while the adjacent sections of the load-supporting beams are further held from longitudinal movement with relation to each other by means of the tie bolts 13ª. In this construction, one section of the load-supporting beam can move relative to the other, as the gusset plate 18 is flexible enough to permit such movement.

It will be readily understood by those familiar with the art that various forms of load-supporting beams can be used other than the I-beam shown in the drawings.

In the specification and claims, I have termed the sectional beams 6 "load-supporting beams" to distinguish them from the scale beams or levers. What I mean by "load-supporting beams" are the beams of the scale which are supported on the scale levers and are arranged to receive the load to be weighed by the scale; but I do not intend to include in the beam any bridge pieces which are connected to a stationary portion and to the scale load-supporting beam.

The advantages of my invention result from the provision of load supporting beams for scales which are arranged to be supported on the scale levers at a plurality of points, and which are formed of a plurality of members or sections connected to each other in such a manner that one of said members can move relatively to another member when a load is moved over the first mentioned member, so that the portion, or portions, of the load supporting beams beyond the points of support between which the load is being moved will not be deflected.

I claim:

1. A track scale having a plurality of longitudinal supporting beams, said beams comprising a plurality of sections arranged to move relative to each other, and longitudinal rails supported on said beams and bridging the joints between the sections thereof, substantially as described.

2. A track scale having a plurality of longitudinal load supporting beams, each of said beams comprising a plurality of sections arranged to move relative to each other, and a continuous rail supported on each of said beams, said rails extending over approximately the entire length of the beams, substantially as described.

3. A track scale having a plurality of levers, a plurality of longitudinal load supporting beams supported on said levers, each load supporting beam comprising a plurality of sections arranged to move relative to each other, and longitudinal rails supported on said beams and bridging the joints between the sections of the beams, substantially as described.

In testimony whereof, I have hereunto set my hand.

CHAS. C. WENTWORTH.

Witnesses:
JAMES P. SCHICK,
C. W. NOEL.